Patented Feb. 18, 1930

1,747,551

UNITED STATES PATENT OFFICE

CHARLES E. KRAUS, OF BABYLON, NEW YORK

BUILDING CEMENT OR PLASTER

No Drawing.   Application filed June 18, 1925. Serial No. 38,104.

This invention relates to producing building cement or plaster very cheaply and which possesses excellent qualities with regard to plasticity and set.

According to the process of the invention there is produced colloidal alumina and silica (where combined silica is present) and sulphates which may be soluble or insoluble, which colloidal alumina and silica or both when used in conjunction with alkaline earths yield excellent cement or plasters.

For the sake of convenience, a material which is developed in the process is called "Krauscake".

Krauscake is a product in which the base is an aluminous earth or mineral matter, such as clay, kaolin, diaspore, cyanite, bentonite, feldspar, bauxite, etc. (materials containing 12% or more of alumina) together with other substances necessary to give the desired results. There may be also suitably added to the mixture, to produce certain desired results alunite, high alumina slag, blast furnace slag, cryolite, etc., as indicated by the hereinafter tables.

The process may be illustrated as follows:
The aluminous earth, as for instance, clay is roasted at a temperature below that which would drive off all the combined water, allowing 20% or less of such water to remain, and upon the addition of alkaline earths, digested with sulphuric acid and water, and after the ingredients have reacted, further water is added to form a slurry. The addition of alkaline earths to material containing the alumina causes colloidal or finely divided alumina to be formed. The silica assumes a colloidal form upon separation from the alumina so that the originally combined silica, as well as the alumina are obtained in the colloidal state. The alkaline earths may be added to the roasted clay, digested with sulphuric acid in the slurry referred to or this slurry may be formed without the addition of alkaline earths and the alkaline earths added later. In carrying out the process therefore I may digest the clay or like material with sulphuric acid as described in the presence of water which produces the material known as Krauscake and then sufficient water is added (as will appear from the tables below) to form a slurry. This is an example of what I have called Slurry A.

To this Slurry A may then be added suitable alkaline earths, the mixture then forming Slurry B and the resulting colloidal content being attained. Thus according to Formula No. 1 of the Slurry A table hereinafter, no alkaline earth is added to this slurry. When, however, this slurry has had added to it an alkaline earth, as for instance calcium hydroxide as shown by Slurry B Formula No. 1 of the following tables, the colloidal content of the alumina as referred to above is obtained. According to Formula No. 2 of the Slurry A table, alkaline earth, namely high calcium limestone, is added in the Slurry A and further alkaline earths may be added according to the various formulæ in the Slurry B table, resulting in the desired colloidal content of the alumina, and any originally combined silica which may have been present with the clay. The essential thing is that the clay or other equivalent aluminous material, roasted as described and digested with sulphuric acid, shall be treated with alkaline earth either in the Slurry A or when the Slurry B is formed. When alkaline material is added in the Slurry A, a highly activated calcium sulphate is produced which I believe to be of advantage in some cases, but it is not of great importance whether the alkaline earth is digested with the materials in forming the Krauscake or is added when the Slurry B is formed.

Of course external heat may be applied to hasten the reactions.

As will appear from the tables hereinafter, alkaline earths, or materials containing alkaline earths, suitable for use in the above process include dolomitic limestone, high calcium limestone, calcium hydroxide, calcium oxide, Portland cement, marl, etc. Also such substances as alunite, cryolite, high calcium slag, blast furnace slag and other substances may be used as indicated in the tables hereinafter.

The Slurry B (which consists of Slurry A to which are added various ingredients as illustrated by the formulæ in the Slurry B table hereinafter) may be roasted or more alkaline earths may be added to the Slurry B, such roasting being according to the material desired, and in either case a product will be produced which, when mixed with water, will have good plasticity, set and strength.

Examples of Slurries A are as follows:

SLURRY A
Parts by weight

| Formula No. | Sulphuric acid | Water | Roasted clay | Bentonite | Alunite | Cryolite | High calcium limestone | Dolomitic limestone | Bauxite | Blast furnace slag | ($H_2O$ water to form slurry) |
|---|---|---|---|---|---|---|---|---|---|---|---|
| 1 | 100 | 120 | 100 | | | | | | | | 480 |
| 2 | 132 | 120 | 100 | 5 | | | 20 | | | | 480 |
| 3 | 136 | 120 | 100 | | 20 | | | | | | 480 |
| 4 | 136 | 120 | 100 | 10 | | 20 | | | | | 480 |
| 5 | 136 | 120 | 100 | | | | | | 20 | | 480 |
| 6 | 136 | 120 | 100 | | | | | | | 20 | 480 |
| 7 | 136 | 120 | 100 | 5 | | | | 20 | | | 480 |
| 8 | 132 | 120 | 100 | | | | | | | | 480 |
| 9 | 132 | 120 | 100 | | | | | | 20 | | 480 |

Examples of Slurries B are as follows:

SLURRY B
Parts by weight

| | Dry wt. "Slurry A" | Calcium oxide | Calcium hydroxide | Gypsum rock | Portland cement | Burned dolomitic limestone | Marl | Dolomitic limestone | High calcium limestone | Barytes |
|---|---|---|---|---|---|---|---|---|---|---|
| Slurry B 1 | 100 | | 100 | | | | | | 100 | |
| Slurry B 2 | 100 | 100 | | 100 | | | | | | |
| Slurry B 3 | 100 | | 100 | 100 | | | | | | |
| Slurry B 4 | 100 | 100 | | 100 | | | | | 100 | |
| Slurry B 5 | 100 | | | 10 | | | | 5 | 100 | |
| Slurry B 6 | 100 | 100 | | | | 100 | | | | |
| Slurry B 7 | 100 | | | 100 | | | | 5 | 100 | |
| Slurry B 8 | 100 | | | | | | | | | 200 |
| Slurry B 9 | 100 | | | | 100 | | | | | |

With regard to roasting, entirely different quick setting products are produced by varying the temperature. Where a high percentage of sulphates are present a roasting temperature of 250° F. to 450° F. gives a quick "flash" set. As the temperature is raised the "set" is retarded. Where a high percentage of calcium hydroxide is present in the mixture the best results are obtained by roasting at a temperature of 400° F. to 600° F.

When extreme plasticity is desired, sufficient calcium oxide may be added to "Slurry B" to take up the free water, which reaction generates sufficient chemical heat for partial dehydration of the sulphates; this heat ranges from 212° F. to 400° F.

In producing the Krauscake, it has been found that by slightly "causticizing" the aluminous earth or mineral matter by adding caustic soda solution, or similar alkali solution, ranging from a strength of ½% to 5%, before roasting, the reaction is hastened. This, however, is not necessary.

What I claim is:

1. A process for producing an improved cement or plaster which comprises treating aluminous material with sulphuric acid to form aluminum sulphate and treating the reaction materials with alkaline earth to produce gelatinous alumina.

2. A process for producing an improved cement or plaster which comprises treating roasted aluminous material with sulphuric acid to form aluminum sulphate and treating the reaction materials with alkaline earth to produce gelatinous alumina.

3. A process for producing an improved cement or plaster which comprises treating aluminous material with sulphuric acid to form aluminum sulphate, and adding alkaline earth to produce gelatinous alumina.

4. A process for producing an improved cement or plaster which comprises treating aluminous material with sulphuric acid to form aluminum sulphate and treating the reaction materials with alkaline earth to produce gelatinous alumina and adding alkaline earth thereto.

5. A process for producing an improved cement or plaster which comprises treating aluminous material with sulphuric acid to form aluminum sulphate and treating the reaction materials with alkaline earth to produce gelatinous alumina and adding alkaline earth thereto and roasting.

6. A process for producing an improved cement or plaster which comprises treating roasted clay with sulphuric acid to form aluminum sulphate and treating the reaction materials with calcium oxide to produce gelatinous alumina.

7. A process for producing an improved cement or plaster which comprises treating a roasted earth comprising aluminous material and combined silica, treating the roasted material with sulphuric acid to form aluminum sulphate and silica, the latter in colloidal form, and treating the reaction materials with alkaline earth to produce gelatinous alumina.

8. A process for producing an improved cement or plaster which comprises treating a roasted earth comprising aluminous material and combined silica, treating the roasted material with sulphuric acid to form aluminum sulphate and silica, the latter in colloidal form, and treating the reaction materials with alkaline earth to produce gelatinous alumina and adding further alkaline earth.

9. A process for producing an improved cement or plaster which comprises roasting aluminous material to reduce its combined water to 20% or less of its normal combined water, treating such roasted aluminous material with sulphuric acid to form aluminum sulphate and treating the reaction materials with alkaline earth to produce gelatinous alumina.

10. A process for producing an improved cement or plaster which comprises roasting clay so that 20% or less of its combined water remains, and treating such roasted clay with sulphuric acid to form aluminum sulphate and treating the reaction materials with calcium oxide to produce gelatinous alumina.

11. A process for producing an improved cement or plaster which comprises roasting clay so that 20% or less of its combined water remains, and treating such roasted clay with sulphuric acid to form aluminum sulphate and treating the reaction materials with calcium oxide to produce gelatinous alumina and adding further calcium oxide.

In testimony whereof I have signed this specification June, 1925.

CHARLES E. KRAUS.